Figure 1:
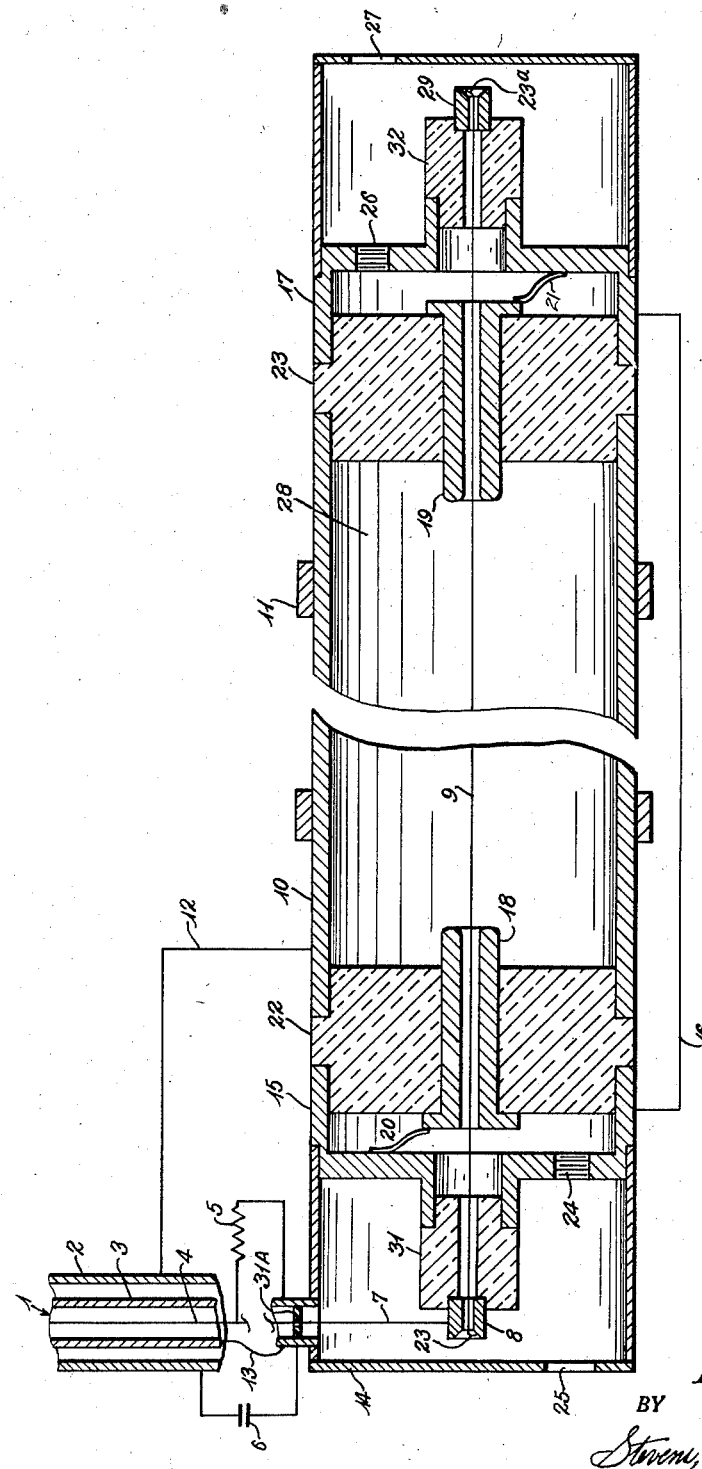

May 12, 1959

R. E. FEARON 2,886,713

GEIGER COUNTER SYSTEMS

Filed Nov. 7, 1955

3 Sheets-Sheet 1

INVENTOR.
Robert E. Fearon
BY
Stevens, Davis, Miller & Mosher
ATTORNEYS

May 12, 1959

R. E. FEARON 2,886,713

GEIGER COUNTER SYSTEMS

Filed Nov. 7, 1955

3 Sheets-Sheet 3

INVENTOR.
Robert E. Fearon
BY
Stevens, Davis, Miller & Mosher
ATTORNEYS

United States Patent Office
2,886,713
Patented May 12, 1959

2,886,713

GEIGER COUNTER SYSTEMS

Robert E. Fearon, Tulsa, Okla., assignor to Electro Chemical Laboratories Corporation, Tulsa, Okla., a corporation of Delaware Application November 7, 1955, Serial No. 545,335

5 Claims. (Cl. 250—83.6)

The problem of performing radioactivity assays of gas containing krypton 85, carbon 14 compounds, radiosulphur compounds, and, especially, compounds of tritium, occurs to an important degree in the work of mass movement tracing of underground fluids in petroleum reservoirs. Such tracers are especially useful because they are not absorbed from the fluids being traced by the clay minerals of porous subsurface reservoir rocks, and, moreover, are of especial value for the good reason of their almost total absence in nature so far as the reservoir fluids are concerned. It has been found that one curie of tritium suffices to satisfactorily mark $2 \times 10^9$ liters (760 mm. Hg and 0° C.) of natural gas, and affords very convenient recognition of the difference between the marked and the unmarked gas. Moreover, according to the best predictions, natural gas at least a hundred times more in volume could be easily marked by one curie of tritium assuming that the radioactivity measurement were convenient and accurate. Generally similar conclusions prevail with respect to the other radioactive substances which have been named.

To solve the above problem, I have invented a new and especially sensitive form of Geiger counter, which is able to directly test the radioactivity of the gases to be analyzed for radioactivity. My Geiger counter is particularly adapted to tolerate the introduction into its interior of gases of widely differing compositions, and will give comparable results in spite of such differences. My special Geiger counter counts tritium with efficiencies from fifty to ninety percent, as distinguished from 20 percent, the best available efficiency possible for tritium by scintillation counting, an inconvenient process requiring extensive chemical processing of the sample. Moreover, the scintillation counting cannot be used conveniently to count the krypton 85, which I find useful in tracing petroleum reservoirs.

By testing the sample inside the counter, making the sample gas itself serve as the counter tube atmosphere extending between the cathode and anode, I overcome the difficulty which results from the absorption of the rays by the counter wall in the case of a conventional thin walled beta ray counter. Especially for tritium, which emits only nonpenetrating low energy electrons (beta rays), this difficulty is very severe for a thin walled beta ray counter of common design.

My Geiger counter also affords means of counting successfully at relatively high pressures of the sample gas filling its interior. For this purpose, my counter is provided with special means of preventing the occurrence of spurious corona on the anode connections, which would cause counts not due to radiation, and interfere with the measurement, if not prevented. Such corona results from the increasing tendency of the corona to occur as the anode voltage is raised, and is a consequence of the relatively high voltage requirements for successful counting in my system when internal atmospheres (sample pressures) are at pressures in excess of one atmosphere. For this I provide a special form of guard ring structure, which I have found to be particularly helpful in connection with my Geiger counter. Also, I surround the emergent electrode (anode) by a shield to minimize the electric field. I also provide an electric wave filter in a very simple form, to permit the guard ring to be charged electrically from the same source of high voltage which charges the anode, but, because of the said filter, electric discharges from the guard ring do not cause spurious counts.

I also afford a counter structure comprising only metal and plastics, thus avoiding the error found in most Geiger counters because of the radioactivity of the potash (potassium) usually present in the glass at a concentration which, typically, is about a fifth of one percent. My Geiger counter is used for making radioactivity assays of gaseous samples in a system wherein it is surrounded by a substantial gamma ray shield composed of non radioactive metal of high density. A shield of five to ten inches thickness of iron is suitable. Lead, bismuth, or other non radioactive metals are also suitable.

It is also advantageous in my Geiger counter system to employ a method of cancellation of cosmic rays, originally described by W. F. Libby. The use of Libby's system, developed for carbon 14 measurements, in my gas assay Geiger counter system, confers unique and special advantages, and enables my system in combination with Libby's to serve for radioactive assays which otherwise would be substantially impossible.

The objects of my Geiger counter systems are:

(1) To provide means of making sensitive and accurate and comparable measurements of radioactivity naturally available gaseous materials carrying various amounts of carbon 14, radiosulphur, tritium, krypton 85, and the like.

(2) To afford means of making measurements as set forth above, and corresponding with sets of gas samples of widely varying chemical compositions.

(3) To afford means of making measurements as set forth in object (1), and in which the concentration of tritium is not more than one curie in $10^{11}$ liters of sample, measured at atmospheric pressure and zero degrees centigrade.

(4) To afford means of making measurements as set forth in object (1), and in which the radioelement being measured emits very non-penetrating ionizing radiations.

(5) To afford means of making measurements of gas samples introduced internally into a Geiger counter at a pressure equal to or greater than one atmosphere and otherwise as provided in object (1).

(6) To afford means as set forth in object (1), and in which spurious counts due to corona on the external (external to the Geiger counter) portion of the anode connection of the counter are eliminated by the use of a guard-ring and shield system.

(7) To afford means as set forth in object (1), and in which counting at anode voltages of five to thirty thousand volts is made possible.

(8) To afford means of extending geologic age determinations by carbon 14 measurements to times exceeding fifty thousand years in the past.

(9) To provide means as indicated in object (1), and in which the Geiger counter body, composed largely of metal, is connected through at least one electrically insulating hollow tube to a source of sample gas to be analyzed.

(10) To provide means as indicated in object (1) and in which the Geiger counter is constructed entirely of plastic and metal parts containing substantially no radioactive contaminations.

(11) To provide means as indicated in object (1) and in which the sample testing Geiger counter is so constructed that it registers more than forty five percent of the disintegrations of tritium atoms occurring in it, as electrical impulses.

(12) To provide means as indicated in object (1), and in which the sample testing Geiger counter is surrounded by a plurality of cosmic ray sensitive Geiger counters, and outside of these, by a substantial non-radioactive gamma ray shield.

(13) To provide means as indicated in objects (1) and (12), in which the sample counter, and the cosmic ray counters are concurrently sensitive, and externally connected together through an electronic system in such a manner that only impulses from the sample counter which are not accompanied by simultaneous impulses from one or more of the cosmic ray counters are registered, all others being cancelled.

(14) Means as set forth in objects (1), (12) and (13), in which more than ninety percent of the spurious counts in the sample, due to cosmic rays, are eliminated.

(15) Means as set forth in all the preceeding objects, (1) to (14), inclusive, in combination.

(16) A Geiger counter including in addition to a cathode and an anode, a guard ring-shield connection, electrically joined to the anode through an electric wave filter of low-pass characteristics.

Other objects, and reasonable variations of the above will be apparent, and are within the spirit and scope of my invention.

Figure 2:
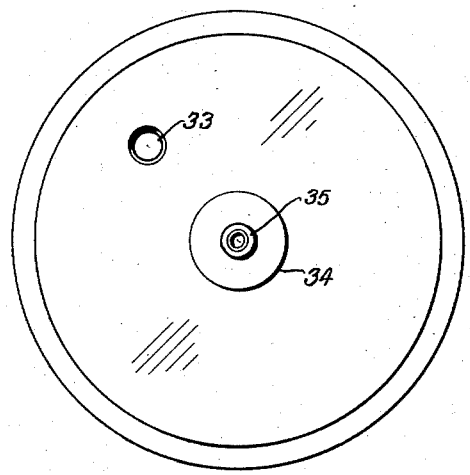
Figure 3:
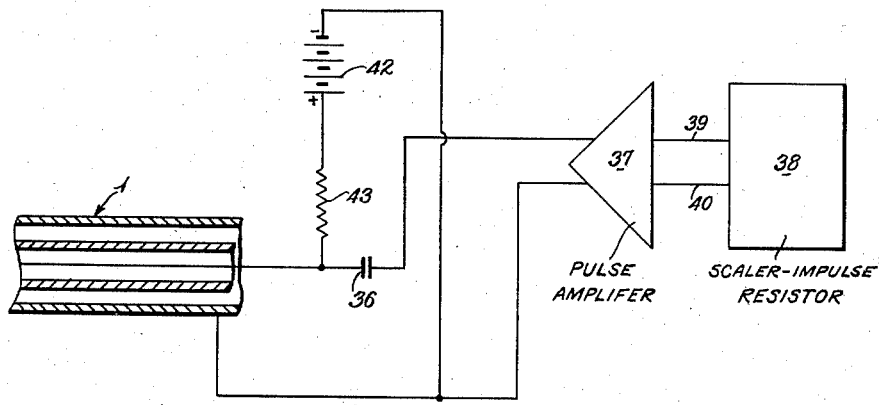
Figure 4:
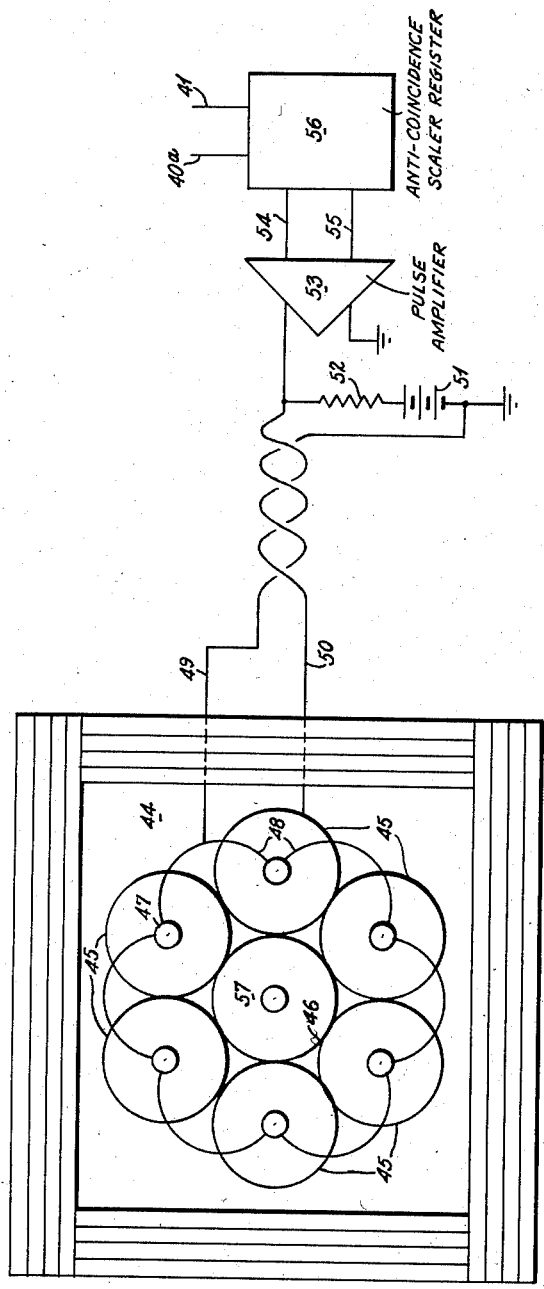

Referring to the figures, Figure 1 is a general side view of my counter tube, in section through its center. Figure 2 is an end view showing the fact that the counter tube is cylindrical. Figure 3 is a diagrammatic view of the electrical system to which the counter may be connected. Figure 4 shows, in an end view, the relationship of my counter tube to the cosmic ray counters, and the gamma ray shield, and, taken together with Figure 3, represents the cosmic ray cancellation arrangement.

More specifically, in Figure 1, the cable 1 consists of three concentric electrodes, each insulated from the others, 2 the earth (and cathode), 3 the guard-shield electrode, at substantially the same potential as the anode 4. A resistor 5, which may be of one megohm, and a condenser 6 which may be of 0.0005 microfarad, interconnect the anode, the cathode, and the guard-shield electrode. These, taken together, are a form of the wave filter set out in object (16). The anode 4 of the cable joins the wire 7, connecting to terminal 8, and, through it, to anode 9 of the counter tube. The cathode 10 of the counter tube is provided with spacing rings 11, and electrically connects through wire 12 to cathode 2 of the cable.

The wire 13 connects the guard-shield electrode of the cable to the electrostatic shield 14 which is mounted on and electrically connected to the guard electrode 15, and hence, exetrnally connected through wire 16 to corresponding guard 17.

Electrode 15 is electrically connected inside the counter through spring 20 to guard-sleeve 18. Similarly, electrode 17 is connected inside the counter through spring 21 to guard-sleeve 19. The guards and guard-sleeves are insulated from the cathode by plastic insulators 22 and 23, which may be polymerized methyl methacrylate. The guards, guard-sleeves, and the cathode, may be of steel, low carbon mild steel is illustrative. Copper may also be used. The anode wire is, typically, of the grade known as bright music wire, and may be of three-thousands of an inch diameter. The wire commercially sold under the trade-name "Excello" is suitable. The wire 9 is sealed at both ends with solder at points 23 and 23a. All surfaces of contact between metal surfaces and metallic electrodes may be sealed by the use of suitable calking material, if desired. Also, joints may be taped over by high vacuum tape, if desired, or filled with silicone or other grease, according to the whim of the operator. Threaded opening 24 affords a point of attachment for a suitable tubing connection, as does threaded opening 26. Suitable plastic or glass tubings emerge through ports 25 and 27. Typically, for counting a gas sample at atmospheric pressure, sample gas is continuously introduced at port 24, and voided at port 26, or vice versa. The effluent port is provided with a long enough tube to prevent mixing of the counter atmosphere with the sample, and thus the counter is full of a continuously purged atmosphere of sample gas. Radioactive atoms disintegrate in the volume 28, and release electrons which are attracted to the anode 9, and travelling there release other electrons, all of which taken together, produce an electrical impulse of electrons, comprising an abrupt fall of potential of the anode 9, which is communicated along the anode wire of cable 1 to the electrical system set out in Figure 3.

The anode 9 and the terminals 8 and 29 are insulated from the connected guard-shield system comprising 15, 14, 17 and 30 by means of insulators 31 and 32, which, again, may be of polymerized methyl methacrylate. Anode wire 7 is supported by insulator 31a, which is of similar material.

The Figure 2 shows an end view, in part of the system of Figure 1. Circles 33 represent threaded opening 26 and port 27. 34 is the outer surface of insulator 32, and 35 is terminal 29.

Figure 3 shows diagrammatically the system which receives and registers the nuclear disintegrations appreciated in the counter tube in the form of abrupt drops of electrical potential in the anode 9, of Figure 1. These drops of potential are continued along the anode, through the cable 1, and through the condenser 36 to pulse amplifier 37 which supplies large, amplified pulses to scaler-impulse register 38. The latter is of the type familiar in nuclear measurements, and gives the reading in terms of the total number of impulses since it was last reset. Alternatively, the wires 39 and 40 may be connected to wires 40a and 41 of the anti-coincidence scaler, shown in Figure 4, if desired.

Further in Figure 3, battery 42 (which may be substituted by a power supply if desired) and resistor 43, which may be from one to ten meghoms, supply the anode voltage typically in the range from 2 to 15 thousand volts, to the anode connector of cable 1. All the connectors of cable 1, shown in Figure 3, are the same as the similarly pictured cable components shown in Figure 1.

Figure 4 shows an array of seven cosmic ray counters, the cathodes of which, 45, are connected electrically by contact, to each other and to the cathode of the sample counter 46. The anodes of the cosmic ray counters, 47, are parallel connected by wires 48. Wires 49 and 50 connect these externally to the anode source, consisting of battery (a power supply may be used, if desired) 51, and resistor 52 to pulse amplifier 53. Pulse amplifier 53 delivers amplified signals to anti-coincidence scaler-register 56, through wires 54 and 55. The gas sample counter 57 is connected as illustrated in Figures 1 and 3, and delivers the output of wires 39 and 40 on terminals 40a and 41 of the anti-coincidence scaler 56. The anti-coincidence scaler 56 registers and accumulates the indication of impulses arising in the sample counter when these are caused by radioactivity of the gas in the sample counter, and correspond with impulses received, as described, on wires 40a and 41. However, when an impulse arriving on wires 40a and 41 is due to a cosmic ray particle, there is nearly always a concurrent pulse from the cosmic ray counter array 44, arriving on wires 54 and 55. The anti-coincidence scaler 56, familiar in the art, has the property that, in this case, the impulse so arriving on wires 40a and 41 is cancelled. Also, impulses on wires 54, 55 are not, in themselves, registered. The system therefore measures radioactivity in the sample counter 57, and ignores cosmic rays affecting it.

Stray gamma rays arising from traces of radioactive material in the walls and floor of the laboratory where the counter is located are prevented from reaching the counter 57 by the gamma ray shield which is constituted as heretofore described, and may be of any dense material which is relatively free of radioactive contamination.

To return again to Figure 1, the dimensions of the cathode 10 and the anode 9, and of the guard sleeves 18 and 19 are related to the gas assay problem requiring that the design be varied to suit the need. The system will tolerate extreme variations of chemical composition of the sample, including ability to count natural gas samples that are 75 percent air if the anode 9 is of ten thousandths of an inch diameter, and the inside of the cathode 10 has a diameter of 250 thousandths. The sleeves 18 and 19 are preferably of about 60 thousandths of an inch outside diameter and 30 thousandths of an inch inside diameter, and project inwardly from the insulators 22 and 23 by about two hundred thousandths of an inch. The inwardly projecting ends of the sleeves 22 and 23 must be rounded and polished. Such a counter will contain, depending on its length and exact diameter, one to several cubic centimeters of natural gas, and will count at an efficiency of about ninety percent for tritium at an anode potential between 7,000 and 9,000 volts, for natural gas at atmospheric pressure.

If the gaseous samples to be analyzed are mixtures consisting of the normally expected hydrocarbons which are found in natural gas, and in the naturally occurring proportions which are common, greater sensitivity can be had by using about the relative dimensions illustrated in the sketch of Figure 1, and with anode, 9, diameter of three thousandths of an inch, and with cathode, 10, inside diameter of about two inches. As before, the inwardly projecting extremities of the sleeves 18 and 19 must be rounded and polished. Such a tube will count natural gas at atmospheric pressure with about fifty percent efficiency for tritium, with an anode, 9, potential in the vicinity of five thousand volts.

What I claim is:

1. In a Geiger counter for directly testing the radioactivity of gases, an annular metallic cathode provided with a plurality of spacing rings secured to the external periphery thereof, non-metallic insulators secured respectively one in each end of the bore of said cathode and provided with an axial orifice substantially concentric therewith, annular metallic guard sleeves mounted one each within said non-metallic insulators, a guard electrode member mounted to engage the periphery of each of said insulators and electrically continuous with said guard sleeve, said guard electrode members each provided with a threaded hole extending transversely therethrough, an elongated anode disposed axially within said cathode and extending centrally through guard sleeve and electrode members, means providing a tensile bias to said anode, and means connected to said Geiger counter for maintaining said anode at a positive potential with respect to said cathode, whereby samples of gas are provided ingress and egress through said tube by virtue of said threaded holes in said electrode members.

2. In a Geiger counter for directly testing the radioactivity of gases, an annular metallic cathode, non-metallic insulators secured respectively one in each end of the bore of said cathode and each having an axial orifice substantially concentric therewith, annular metallic guard sleeves mounted one each within a respective orifice of said non-metallic insulators and projecting into the bore of said cathode, a pair of annular electrode members electrically integral with said guard sleeves and supported by a respective one of said non-metallic insulators adjacent the periphery thereof and forming a shield for the adjacent end of the bore of said cathode, an elongated anode disposed axially within said cathode and extending centrally through said guard sleeves and said electode members, means to provide a tensile bias to said anode, means to introduce samples of gas into the bore of said cathode, means for maintaining said anode at a positive potential with respect to said cathode, and means for maintaining said guard sleeves and said electrode members at a potential substantially equal to the potential of said anode.

3. In a Geiger counter for directly testing the radioactivity of gases, an annular metallic cathode maintained substantially at ground potential, non-metallic insulators secured respectively one in each end of the bore of said cathode and each having an axial orifice substantially concentric therewith, annular metallic guard sleeves mounted one each within a respective orifice of said non-metallic insulators and projecting into the bore of said cathode, a pair of annular electrode members electrically integral with said guard sleeves and supported by a respective one of said non-metallic insulators adjacent the periphery thereof and forming a shield for the adjacent end of the bore of said cathode, an elongated anode disposed axially within said cathode and extending centrally through said guard sleeves and said electrode members, means to provide a tensile bias to said anode, means to introduce samples of gas into the bore of said cathode, means for maintaining said anode at a high positive potential with respect to said cathode, and means for maintaining said guard sleeves and said electrode members at a potential substantially equal to the potential of said anode and said electrode members and a capacitor intercoupling said electrode members and ground.

4. In a Geiger counter for directly testing the radioactivity of gases, an annular metallic cathode, non-metallic insulators secured respectively one in each end of the bore of said cathode and each having an axial orifice substantially concentric therewith, annular metallic guard sleeves mounted one each within a respective orifice of said non-metallic insulators and projecting into the bore of said cathode, a pair of annular electrode members electrically integral with said guard sleeves and supported by a respective one of said non-metallic insulators adjacent the periphery thereof and forming a shield for the adjacent end of the bore of said cathode, an elongated anode disposed axially within said cathode and extending centrally through said guard sleeves and said electrode members, means to provide a tensile bias to said anode, means to introduce samples of gas at a pressure at least equal to atmospheric pressure into the bore of said cathode, means for maintaining said anode at a positive potential with respect to said cathode, and means for maintaining said guard sleeves and said electrode members at a potential substantially equal to the potential of said anode comprising a resistor intercoupling said electrode members and said anode and a capacitor intercoupling said electrode members and said cathode.

5. In a Geiger counter for directly testing the radioactivity of gases, an annular metallic cathode, non-metallic insulators secured respectively one in each end of the bore of said cathode and each having an axial orifice substantially concentric therewith, annular metallic guard sleeves mounted one each within a respective orifice of said non-metallic insulators and projecting into the bore of said cathode, a pair of electrode members each supported by a respective one of said non-metallic insulators adjacent the periphery thereof and defining, with the respective non-metallic insulator, a chamber external to the bore of said cathode, means to electrically connect said electrode members and said guard sleeves, an elongated anode disposed axially within said cathode and extending centrally through said guard sleeves and into said chambers, means in said chambers to provide a tensile bias to said anode, means to introduce samples of gas into the bore of said cathode, means comprising a conductor extending through one of said chambers for maintaining said anode at a positive potential with respect to said cathode, and means for maintaining said guard sleeves and said electrode members at a potential substantially equal to the potential of said anode comprising a resistor intercoupling said conductor and said electrode members, said resistor having a resistance value sufficiently high to suppress the accumulation of free electrons by said electrode members and said guard sleeves.

References Cited in the file of this patent

UNITED STATES PATENTS

| | | |
|---|---|---|
| 2,479,600 | Borkowski | Aug. 23, 1949 |
| 2,535,066 | Herzog | Dec. 26, 1950 |
| 2,605,435 | Krasnow et al. | July 29, 1952 |
| 2,740,894 | Deisler et al. | Apr. 3, 1956 |

OTHER REFERENCES

"A Methane Flow Beta-Proportional Counter" by Bernstein et al., The Review of Scientific Instruments, vol. 20, No. 5, May 1949, pages 347–349.

"A Survey Meter for Soft Betas in Air" by Block, Nucleonics, vol. 8, No. 4, April 1951, pages 51–54.